June 8, 1937.  M. B. TARK  2,082,855
MIXING AND COAGULATING DEVICE
Filed Jan. 25, 1936   2 Sheets-Sheet 2
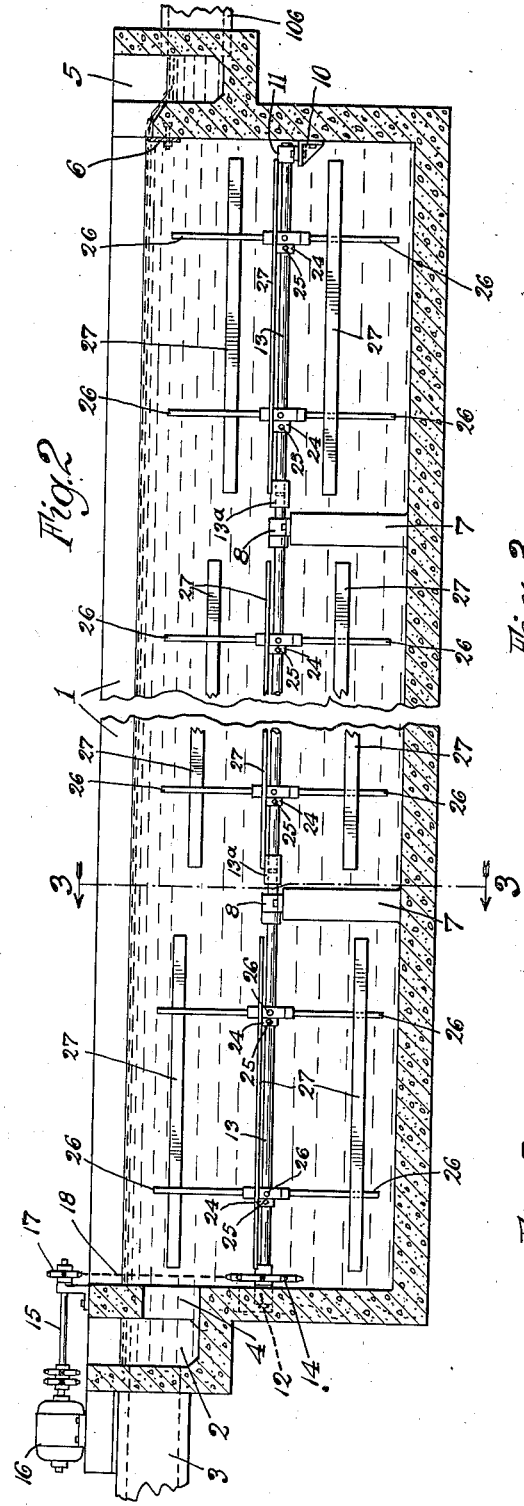
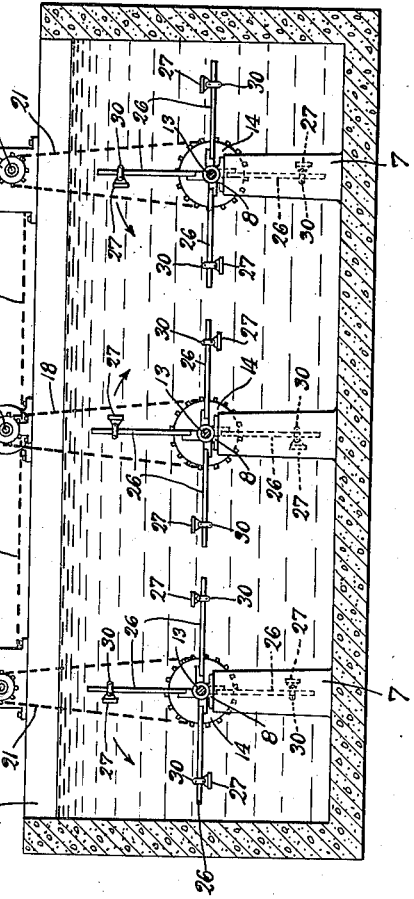
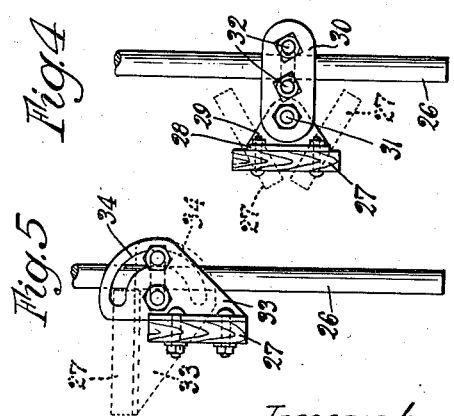
Inventor
Marcus B. Tark
by Parks & Curtis
Attorneys.

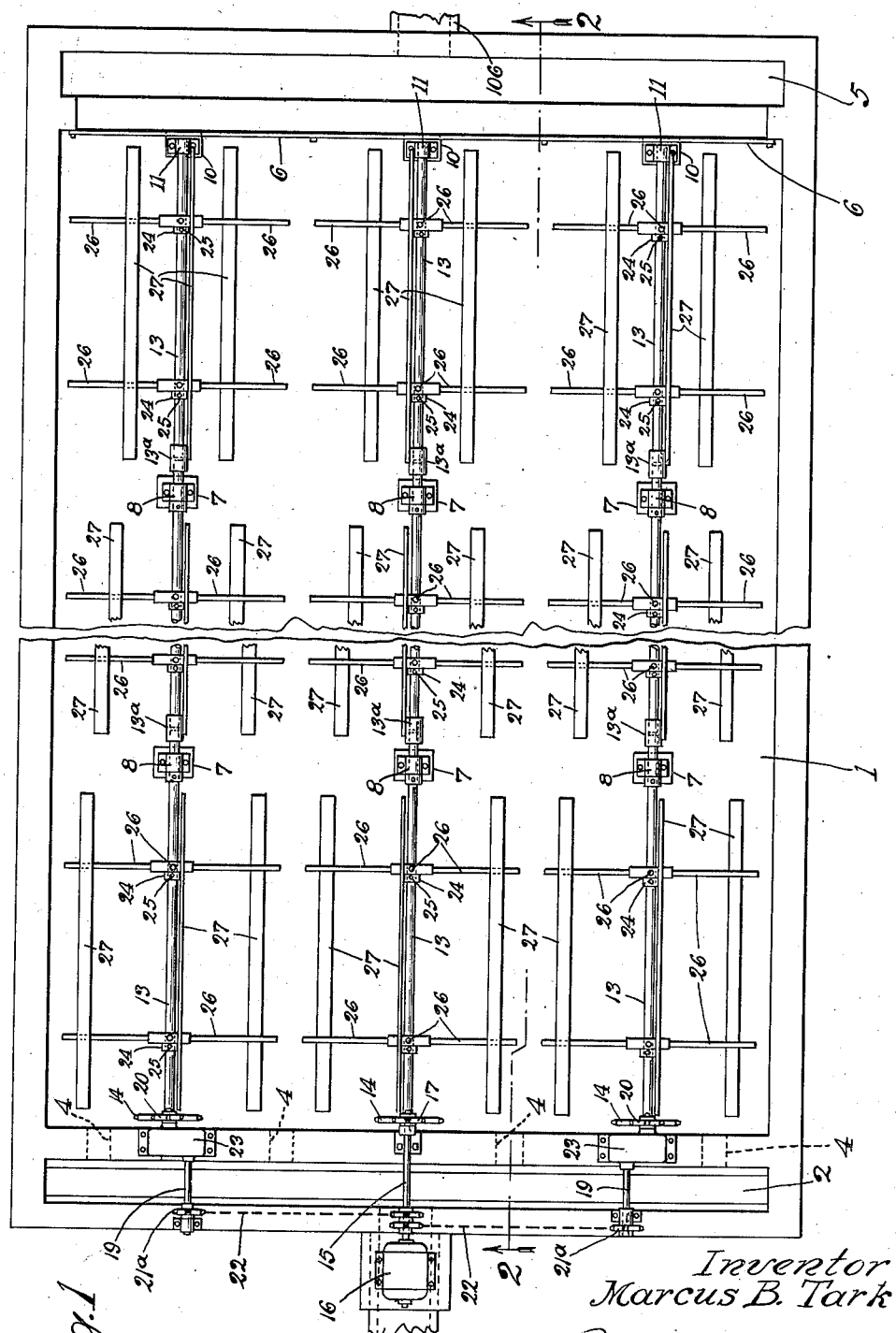

Patented June 8, 1937

2,082,855

UNITED STATES PATENT OFFICE 2,082,855

MIXING AND COAGULATING DEVICE

Marcus B. Tark, Philadelphia, Pa., assignor to Link-Belt Company, Chicago, Ill., a corporation of Illinois Application January 25, 1936, Serial No. 60,800

3 Claims. (Cl. 259—104)

My invention relates to improvements in mixing and coagulating devices and has for one object to provide a new and improved form of such device wherein the necessary agitation of the material may be easily and conveniently adjusted and may, if desired, be differentially controlled in different parts of the flocculating tank. Other objects will appear from time to time throughout the specification and claims.

My invention is illustrated more or less diagrammatically in the accompanying drawings, wherein—

Figure 1 is a plan view;

Figure 2 is a longitudinal vertical section along the line 2—2 of Figure 1;

Figure 3 is a transverse cross section along the line 3—3 of Figure 1;

Figure 4 is a detail side elevation of one form of blade support;

Figure 5 is a detail of a modified form.

Like characters indicate like parts throughout the specification and drawings.

1 is a tank having extending across one end an influent channel 2, adapted to receive liquid through a conduit 3, and to discharge it into the tank through ports 4. 5 is an effluent channel extending across the opposed end of the tank. 6 is an adjustable effluent weir extending across substantially the length of the tank adapted to control the liquid level in the tank and receive the effluent which is withdrawn through a conduit 106.

Projecting upwardly from the bottom of the tank are a series of pedestals 7 of concrete or the like. Mounted on these pedestals are bearings 8. These piers are arranged in a plurality of lines parallel with the longitudinal axis of the tank and in line with them on the effluent wall of the tank are brackets 10, which carry end bearings 11. Also in line with them in the influent wall are bearings 12. 13, 13 are shafts extending the length of the tank supported in the bearings 8, 11 and 12. The shaft may be continuous or as indicated may be formed of a series of shaft sections arranged end to end and joined by collars 13a. The influent end of each such shaft carries a chain sprocket 14. 15 is a drive shaft mounted above the liquid level upon the influent wall adapted to be driven by a motor 16. It carries a sprocket 17, which drives a chain 18 to drive the sprocket 14 on the central shaft. On each side of the drive shaft 15 are shafts 19, each carrying a sprocket 20 to drive by means of chain 21 similar sprockets 14 on the outboard shafts. The shafts 19 are driven by chains 22 from the shaft 15, there being sprockets 21a on each shaft to drive said chains. By this arrangement all the shafts contained within the tank may be driven in unison. By the arrangement shown they may all be driven in the same direction. Gear boxes 23 may be used in connection with one or more of the shafts to change the direction of rotation, if it is desired as will normally be the case, so that the shafts drive in opposite directions.

Mounted on each shaft at two spaced points between each pair of bearings are hubs 24 held in position on the shaft by means of set screws 25. Projecting from each of these hubs are a plurality of radial arms 26. Each pair of radial arms carries a paddle blade 27. Each paddle blade 27 is mounted on two brackets 28, the bracket having an ear 29 extending rearwardly to engage a stirrup 30. A nut and bolt 31 allows this ear to be locked in angular position with respect to the stirrup 30 and U-bolts and nuts 32 permit adjustment of the stirrup radially, as indicated in Figure 4. In the modified form shown in Figure 5, the blade 27 is mounted on a bracket 33, which bracket is pivoted on one arm of the U and is radially slotted at 34 to engage the other arm so that the bracket may be held in any suitable angular position by tightening up the nuts which hold the U-bolt. In the form shown in Figure 4, the blade has a pivotal movement of 180 degrees. In the form shown in Figure 5, it has a pivotal movement of but ninety degrees. Under some circumstances the added application of the 180 degree pivotal movement is desirable.

The equipment which forms the subject matter of my invention is intended for use as a stirring and agitating means for the treatment of sewage or similar material by chemicals. When sewage, water or other liquids are to be chemically dosed to cause coagulation or flocculation, it is necessary that the comparatively small amount of chemical be entirely diffused throughout the entire volume of the liquid and given a controlled period of detention to insure uniform dosage and uniform reaction. In order to accomplish this, the liquid is usually pre-treated with the chemical before it is introduced to the tank, then is allowed to flow into the tank and is detained there for a sufficient length of time to permit adequate mixing of the water with the chemical, and a sufficient period of time for the chemical reactions to be completed. After that the mixed liquid is withdrawn to a settling tank.

The paddles and supporting arms are as indicated entirely submerged beneath the liquid level. The shafts rotate at relatively slow speed and cause a mild agitation and mixing of the liquid. Since the shafts rotate preferably in opposite directions, eddy currents will be set up and the liquid will be mixed and intermingled. In order to permit this mixing effect, I mount on the shafts the plurality of radial arms as shown. Depending upon the results desired, the character of the material being treated and the like, the effect of the mixing machinery will be controlled and adjusted by radially positioning the paddles at different points. Thus of course, effecting the rate of travel of the blade through the liquid. Again the paddle blades themselves may be given various angular inclinations all depending upon the experience of the operator and the necessity of the occasion.

Under some circumstances, the adjustment of all the paddles will be the same. Under other circumstances they might all be different and variations or gradations along the tank either in the direction of flow or transverse to it, will be desirable. The arrangement which I have proposed then makes it possible to adjust the violence of the mixing effect quite independent of the power mechanism and quite independent of the rate of rotation. The details of construction may differ and I do not limit my invention to the machine shown and described.

It will be evident that while I have shown and described an operating device, still many changes might be made in the size, shape, arrangement and disposition of parts without departing materially from the spirit of my invention and I wish, therefore, that my showing be taken as in a large sense diagrammatic.

I claim:

1. In a mixing and flocculating device, a horizontally disposed shaft, supporting bearings therefor spaced therealong, radial arms projecting from the shaft adjacent the bearings, brackets slidable along said arms and means for locking the brackets in radially adjusted position thereon, blades generally parallel with the shaft pivoted on the brackets and means for locking the blades in angularly adjusted position thereon.

2. A mixing and flocculating device comprising a tank, pedestals therein, bearings mounted on said pedestals, a shaft supported by said bearings and extending longitudinally of the tank, radial arms projecting from the shaft, there being not less than two between each two bearings, brackets slidable radially along said arms and means for locking them in adjusted position, blades located generally parallel with the shaft and pivotally supported on said brackets and means for locking them in angularly adjusted position.

3. A mixing and flocculating device comprising a tank, pedestals therein, bearings mounted on said pedestals, a shaft supported by said bearings and extending longitudinally of the tank, radial arms projecting from the shaft, there being not less than two between each two bearings, brackets slidable radially along said arms and means for locking them in adjusted position, blades located generally parallel with the shaft and pivotally supported on said brackets and means for locking them in angularly adjusted position, drive means above the level of the liquid in the tank comprising a motor and drive shaft, a sprocket overhanging the wall of the tank, a sprocket on the shaft and a driving connection between the sprockets whereby the motor may cause rotation of the shaft.

MARCUS B. TARK.